United States Patent
Rehnlund et al.

(10) Patent No.: US 11,108,033 B2
(45) Date of Patent: Aug. 31, 2021

(54) ELECTROCHEMICAL DEVICE AND METHOD FOR CHARGING THE ELECTROCHEMICAL DEVICE

(71) Applicants: David Rehnlund, Uppsala (SE); Leif Nyholm, Uppsala (SE)

(72) Inventors: David Rehnlund, Uppsala (SE); Leif Nyholm, Uppsala (SE)

(*) Notice: Subject to any disclaimer, the term of this patent is extended or adjusted under 35 U.S.C. 154(b) by 177 days.

(21) Appl. No.: 16/496,579

(22) PCT Filed: Mar. 26, 2018

(86) PCT No.: PCT/SE2018/050323
§ 371 (c)(1),
(2) Date: Sep. 23, 2019

(87) PCT Pub. No.: WO2018/182490
PCT Pub. Date: Oct. 4, 2018

(65) Prior Publication Data
US 2020/0112017 A1    Apr. 9, 2020

(30) Foreign Application Priority Data

Mar. 31, 2017 (SE) .................................. 1750397-0

(51) Int. Cl.
*H01M 4/13* (2010.01)
*H01M 4/04* (2006.01)
(Continued)

(52) U.S. Cl.
CPC ......... *H01M 4/0445* (2013.01); *H01M 4/134* (2013.01); *H01M 4/382* (2013.01);
(Continued)

(58) Field of Classification Search
CPC .. H01M 4/0445; H01M 4/044; H01M 4/0442; H01M 4/134; H01M 4/136;
(Continued)

(56) References Cited

U.S. PATENT DOCUMENTS 8,273,263 B2 * 9/2012 Kubo ................ H01M 10/0525
252/62.2
8,735,003 B2 * 5/2014 Kim ...................... H01M 4/505
429/320
(Continued)

FOREIGN PATENT DOCUMENTS

EP    0981194 A2    2/2000
EP    1947714 A1    7/2008
(Continued)

OTHER PUBLICATIONS

Z. Li et al., "A review of lithium deposition in lithium-ion and lithium metal secondary batteries", Journal of Power Sources 254 (2014), pp. 168-182.
M. Z. Mayers et al., "Suppression of Dendrite Formation via Pulse Charging in Rechargeable Lithium Metal Batteries", The Journal of Physical Chemistry 2012, 116, pp. 26214-26221.

*Primary Examiner* — Raymond Alejandro
(74) *Attorney, Agent, or Firm* — Capitol City TechLaw

(57) ABSTRACT

The present invention relates to an electrochemical cell (10) comprising a negative electrode (11) comprising alkali metal or alkaline earth metal (e.g. lithium), a positive electrode (12), and an electrolytic solution (13) between the negative electrode (11) and positive electrode (12). A salt (e.g. $LiPF_6$) comprising ions of the corresponding alkali metal or alkaline earth metal of the negative electrode is dissolved in the electrolytic solution (13) with a molarity lower than 0.25M, and at least one supporting salt (e.g. $TBAPF_6$) is dissolved in the electrolytic solution to improve the conductivity of the electrolytic solution. In addition, the electrochemical cell is configured to receive at least one electrical nucleation pulse (20; 40) having a pulse length ($l_p$) prior to applying an electrical deposition current (21; 41) for charging of the electrochemical cell (10).

20 Claims, 8 Drawing Sheets

(51) Int. Cl.
*H01M 4/134* (2010.01)
*H01M 4/38* (2006.01)
*H01M 10/04* (2006.01)
*H01M 10/0568* (2010.01)
*H01M 10/44* (2006.01)
*H01M 4/02* (2006.01)

(52) U.S. Cl.
CPC ..... *H01M 10/049* (2013.01); *H01M 10/0568* (2013.01); *H01M 10/44* (2013.01); *H01M 2004/027* (2013.01); *H01M 2004/028* (2013.01)

(58) Field of Classification Search
CPC .... H01M 4/382; H01M 4/381; H01M 10/049; H01M 10/0568; H01M 10/0566; H01M 10/44; H01M 10/446; H01M 2004/027; H01M 2004/028
See application file for complete search history.

(56) References Cited

U.S. PATENT DOCUMENTS

| | | | | |
|---|---|---|---|---|
| 9,799,922 | B2 * | 10/2017 | Park | H01M 10/052 |
| 2004/0053129 | A1 | 3/2004 | Jung et al. | |
| 2015/0318540 | A1 * | 11/2015 | Take | H01M 4/5825 |
| | | | | 429/213 |
| 2016/0218341 | A1 | 7/2016 | Kumar et al. | |
| 2016/0233549 | A1 | 8/2016 | Tiruvannamalai et al. | |

FOREIGN PATENT DOCUMENTS

| | | |
|---|---|---|
| JP | 2015138654 A | 7/2015 |
| WO | 0076049 A1 | 12/2000 |
| WO | 2015074006 A1 | 5/2015 |

* cited by examiner

ELECTROCHEMICAL DEVICE AND METHOD FOR CHARGING THE ELECTROCHEMICAL DEVICE

This application claims priority under 35 USC 119(a)-(d) to SE patent application No. 1750397-0 filed Mar. 31, 2017, the entire content of which is incorporated herein by reference.

TECHNICAL FIELD

The present invention relates to an electrochemical cell having a metallic lithium electrode, and a low molarity of lithium salt in combination with a supporting salt dissolved in the electrolyte. The present invention further relates to an electrochemical device, a method for charging an electrochemical device, a charger, a computer program for controlling a charger and an energy system.

BACKGROUND

Advanced energy storage has been a key component in the portable electronics revolution. Electric energy storage, primarily battery technologies, has found increased interest in the last decade as the transportation industry is being electrified. Battery technologies, with its champion the Li-ion battery, are as such now preparing to take over the transportation sector and utility grid. The original lithium battery utilized metallic lithium as the negative electrode since it has the lowest electrode potential and highest gravimetric capacity among possible anode materials.

In spite of intense research and development during the last four decades, Li metal batteries with liquid electrolytes have never been truly commercialized, with a few brief exceptions. Lithium metal anodes were quickly abandoned due to serious safety hazards and low coulombic efficiencies. Safety issues originate from the irregular growth and dissolution of lithium as it is reversibly cycled. These so called dendrites progressively grow through the cell, eventually leading to battery shorting and possibly enough heat to cause fires.

Meanwhile, lithium reacts with organic solvents and forms a relatively stable solid-electrolyte interphase (SEI) surface film. During repeated cycling the SEI film is damaged by mechanical stress or dissolution, thus exposing fresh lithium surface to the electrolyte causing further reaction. Repeated SEI formation consumes charge and leads to low cycling efficiencies (i.e. coulombic efficiencies). The reaction is further amplified when dendritic lithium growth increases the surface area of the electrode.

Despite these challenges, considerable research and development of lithium metal anodes has been performed for the last 40 years. In fact, the issue has become even more important as next generation battery systems (e.g. Li—O and Li—S) require lithium metal anodes to attain high energy densities.

These challenges are applicable not only to lithium metal anodes, but also to other types of battery chemistries involving anode materials within the group of alkali metals and alkaline earth metals, wherein the electrolytic solution comprises an ion that is deposited on the anode when charged.

Alkali metals include, in addition to lithium, any of the elements sodium, potassium, rubidium, cesium, and francium, occupying Group IA of the periodic table. They are very reactive, electropositive, monovalent metals forming strongly alkaline hydroxides. Alkaline earth metals include any of the elements beryllium, magnesium, calcium, strontium, barium, and radium, occupying Group IIA of the periodic table. They are reactive, electropositive, divalent metals, and form basic oxides which react with water to form comparatively insoluble hydroxides.

A tremendous amount of effort has been devoted to understanding the mechanism of lithium dendrite formation and growth. The physical properties of the separator has been found to influence the dendrite growth behavior, as a separator with a shear modulus at least twice that of lithium has been proposed to effectively suppress dendrite growth. This has sparked off intensive research into stable solid and polymer electrolytes.

Local ion depletion and uneven ion distribution at the metal-electrolyte interface has been suggested to cause uneven lithium metal deposition and growth. This can be a result of an uneven metal morphology or the nature of the solid-electrolyte interphase (SEI), which can lead to dendrite initiation and growth even at low current densities. The dendrite growth rate is also known to be dependent of the applied current density. Based on this knowledge regarding the dendrite formation and growth mechanism, several prevention strategies have been investigated.

The following general avenues summarize the main research approaches used in the field:

1) improving the mechanical properties of the SEI by modifying the electrolyte components (e.g. salts, solvents and additives) or by using solid or polymer electrolytes;

2) reducing the effective current density by increasing the electrode surface area (e.g. employing high surface area current collectors);

3) utilizing electrostatic $Li^+$ repulsion from the tips of the growing dendrites by adding unreactive alkali metal ions (e.g. $Cs^+$ and $Rb^+$).

Sadly, the problem remains unsolved, as none of these strategies have provided a satisfying solution. While reinforced SEI layers based on electrolyte modifications can provide a temporary relief, no long term protection has been demonstrated. In contrast, polymer and solid electrolytes are typically mechanically stable but exhibit too low ionic conductivities at room temperature, poor electrolyte/electrode interface adhesion and high costs. Electrostatic repulsion layers are unlikely to prevent dendritic growth since lithium still will be deposited on the electrode during the charging of the device. It should be stressed that any solution to the problem must hinder dendritic growth while simultaneously limiting the SEI formation to achieve a coulombic efficiency close to 100%, which may require several strategies.

Thus, there is a need to reduce the dendritic growth on alkali metal, or alkaline earth metal, anode electrodes in electrochemical devices, and thereby reducing, or eliminating, the risk for battery shorting.

SUMMARY

An object of the invention is to provide an electrochemical cell having an alkali metal, or alkaline earth metal, anode that is adapted to reduce the dendritic growth on the anode surface when used as a rechargeable secondary energy storage device.

This is achieved by an electrochemical cell comprising a negative electrode comprising alkali metal or alkaline earth metal, a positive electrode, and an electrolytic solution between the negative electrode and positive electrode. A salt comprising ions of the corresponding alkali metal or alkaline earth metal of the negative electrode is dissolved in the electrolytic solution with a molarity lower than 0.25M, and at least one supporting salt is dissolved in the electrolytic solution to improve the conductivity of the electrolytic solution. The electrochemical cell is further configured to receive at least one electrical nucleation pulse having a pulse length prior to applying an electrical deposition current for charging of the electrochemical cell.

An advantage with the present invention is that the extent of dendritic growth is reduced while simultaneously limiting the continuous solid-electrolyte interphase (SEI) formation.

Another advantage with the present invention is that the number of functional charge/discharge cycles is increased.

Further suitable embodiments of the invention are defined in the dependent claims.

DETAILED DESCRIPTION

The examples discussed in the description relates to the use of one particular alkali metal, namely lithium, but the scope of the invention should not be limited to this. Other alkali metals, i.e. sodium, potassium, rubidium, cesium, and francium, all occupying Group IA of the periodic table, may be used instead of lithium. In addition, the concept behind the invention is also applicable to alkaline earth metals, i.e. beryllium, magnesium, calcium, strontium, barium, and radium, all occupying Group IIA of the periodic table.

Dendritic formation and growth on the anode of an electrochemical cell occurs when the electrolytic solution contains ions of the corresponding alkali metal or alkali earth metal in the anode, e.g. a dissolved salt containing lithium ions in the electrolytic solution when using metallic lithium as the anode in the electrochemical cell.

Another field of research has focused on understanding the relationship between the current distribution, concentration gradient, and the nucleation and growth of the dendrites.

Electrochemical deposition is a suitable technique for studies of the development of metal morphologies under mass-transfer controlled conditions, because the rate of reaction can be delicately tuned by modifying the electrode potential or current density. Unlike the previously mentioned methods all focusing on modifying the metal-electrolyte interface, electrochemical deposition strategies focus on controlling the lithium deposition reaction directly. The formation of dendrites under mass-transfer limited conditions can then be explained by addressing surface irregularities. The key lies in the understanding of the mass transfer of lithium ions in the electrolyte, which is increased near the protruding parts of the substrate. This causes more rapid mass transfer of lithium ions to the regions with protruding parts, resulting in promoted growth of these irregularities.

Another interesting strategy is the use of pulsed plating schemes in which intermittent resting periods are used during the deposition to control the mass transfer and to stabilize the lithium ion concentration gradient at the lithium metal electrode.

In the description, the lithium growth morphology is disclosed under electrodeposition conditions where a large nucleation pulse is applied prior to galvanostatic deposition. The effect of low lithium ion concentration electrolytes on the lithium deposition process is also disclosed, both separately and in combination with the nucleation pulse. By varying these parameters good conditions that yield control over the lithium nucleation and lithium ion mass transfer to the metallic electrode can be obtained. Factors influencing the lithium dendrite formation and growth are described based on the use of an applied nucleation pulse and the lithium ion concentration in the electrolyte.

Figure 1:
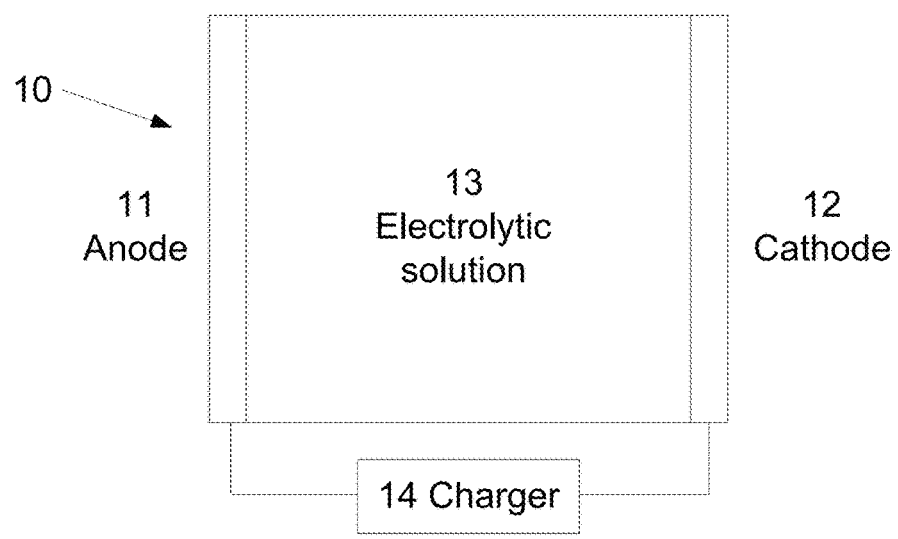
FIG. 1 shows an electrochemical cell connected to a charger.

In electrochemistry, a supporting salt is defined as a chemical species that is not electroactive (within the range of potentials used) when added to an electrolytic solution. According to an International Union of Pure and Applied Chemistry (IUPAC) definition, a supporting electrolyte is an electrolyte containing at least one supporting salt which has an ionic strength and conductivity much larger than those of the electroactive species. Supporting electrolytes are also sometimes referred to as inert electrolytes or inactive electrolytes. FIG. 1 illustrates a rechargeable electrochemical cell 10 with an anode 11 (i.e. a negative electrode) and a cathode 12 (i.e. positive electrode) with an electrolytic solution 13 between the anode and the cathode. A charger 14 is connected between the anode and cathode to recharge the battery cell before it may be connected to a load. (not shown).

As mentioned above, the anode comprises alkali metal or alkaline earth metal, preferably in metallic form. In one aspect of the disclosure, the anode comprises an element selected from the group: lithium, sodium, potassium, magnesium or calcium with corresponding salt. The selection of a suitable cathode is based on the element selected for the anode and the corresponding salt.

According to one aspect, the anode comprises metallic lithium and the salt is a lithium salt. Examples of suitable cathode materials are: lithium cobalt oxide (LCO), lithium manganese oxide (LMO), nickel cobalt manganese oxide (NCM), lithium iron phosphate (LFP) and lithium iron fluorosulphate (LFSF). However, conversion materials and alloying anodes (Si, Ge, Sn, etc.), chalcogenides (S, Se, Te), and metal halides (F, Cl, Br, I) may be used.

The metallic lithium anode, may comprise monolithic lithium metal in a suitable shape (such as foil, bits, etc.), or the anode may comprise lithium powder and a binder, optionally mixed with a conductive additive (such as carbon).

The electrolytic solution comprises a salt comprising ions of the corresponding alkali metal or alkaline earth metal of the anode dissolved in the electrolytic solution with a molarity lower than 0.25M, and at least one supporting salt is dissolved in the electrolytic solution which improves the conductivity of the electrolytic solution.

The electrolytic solution may include one or several supporting salts. Examples of suitable supporting salts are: tetrabutylammonium hexafluorphosphate (i.e. TBAPF6), tetraethylammonium hexafluorphosphate (i.e. TEAPF6) and tetrahexylammonium hexafluorophosphate (i.e. THAPF6).

In addition, the electrochemical cell is configured to receive at least one electrical nucleation pulse having a pulse length prior to applying an electrical deposition current for charging the electrochemical cell. This is obtained by configuring the cathode to have a large active surface area.

In one embodiment, the salt dissolved in the electrolytic solution has a molarity higher than 0.001M, i.e. in the range: 1 mM-0.25M. In another embodiment, the salt dissolved in the electrolytic solution has a molarity lower than 0.1M, i.e. <0.1M or in the range: 1 mM-0.1M. In yet another embodiment, the salt dissolved in the electrolytic solution has a molarity higher than 0.01M, i.e. in the range: 10 mM-0.25M or 10 mM-0.1M.

In one embodiment, the supporting salt dissolved in the electrolytic solution has a molarity higher than 0.004M and lower than 3M, i.e. in the range: 4 mM-3M. In another embodiment, the supporting salt dissolved in the electrolytic solution has a molarity lower than 2M, i.e. <2M or in the range: 4 mM-2M. In yet another embodiment, the supporting salt dissolved in the electrolytic solution has a molarity higher than 1M, i.e. in the range: 1M-2M or 1M-3M.

In one embodiment, the salt dissolved in the electrolytic solution has a molarity of 0.001M and the supporting salt dissolved in the electrolytic solution has a molarity of 1M, i.e 0.001M/1M salt to supporting salt concentration. In another embodiment, the salt dissolved in the electrolytic solution has a molarity of 0.02M and the supporting salt dissolved in the electrolytic solution has a molarity of 1M, i.e 0.02M/1M salt to supporting salt concentration. In yet another embodiment, the salt dissolved in the electrolytic solution has a molarity of 0.25M and the supporting salt dissolved in the electrolytic solution has a molarity of 2M, i.e 0.25M/2M salt to supporting salt concentration.

The conductivity of the electrolyte is important for lowering the migration contribution to the mass transport of faradaic active ions in the electrolyte. Therefore the at least one supporting salt dissolved in the electrolytic solution may have a molarity at least 4 times higher than the molarity of the salt dissolved in the electrolytic solution. In one aspect, the conductivity of the combined at least one supporting salt and salt dissolved in the electrolytic solution corresponds to that of an electrolyte containing only a salt with a molarity of 1M.

Treatment of an electrochemical device having at least one electrochemical cell described above comprises applying at least one electrical nucleation pulse having a pulse length prior to applying an electrical deposition current for charging the electrochemical device. As mentioned above, each electrochemical cell is configured to receive at least one electrical nucleation pulse, and FIGS. 2-5 illustrate different types of single nucleation pulses that could be used to obtain the desired behavior of the electrochemical cell prior to applying an electrical deposition current for charging of the electrochemical cell.

Several nucleation pulses may be applied after each other to ensure that the surface of the anode has been treated. For instance, a nucleation pulse may be applied for 10 ms followed by a pause of a couple of minutes and then another nucleation pulse for 10 ms followed by a pause of a couple of minutes, etc. The number of nucleation pulses and the time interval between the nucleation pulses depends on the purity of the lithium electrode, the cell design, $Li^+$ concentration in the electrolyte, etc.

Deposition on the surface of the anode occurs during charging when the electric deposition current is applied between the negative electrode and the positive electrode, and according to one aspect the applied deposition current is selected to be less than 10 $mA/cm^2$, i.e. <10 $mA/cm^2$. According to another aspect the applied deposition current is selected to be less than 5 $mA/cm^2$, i.e. <5 $mA/cm^2$. According to still another aspect the applied deposition current is selected to be less than 1 $mA/cm^2$, i.e. <1 $mA/cm^2$.

During charging, the applied deposition current may be selected to be continuous, intermittent or pulsed.

Figure 2:
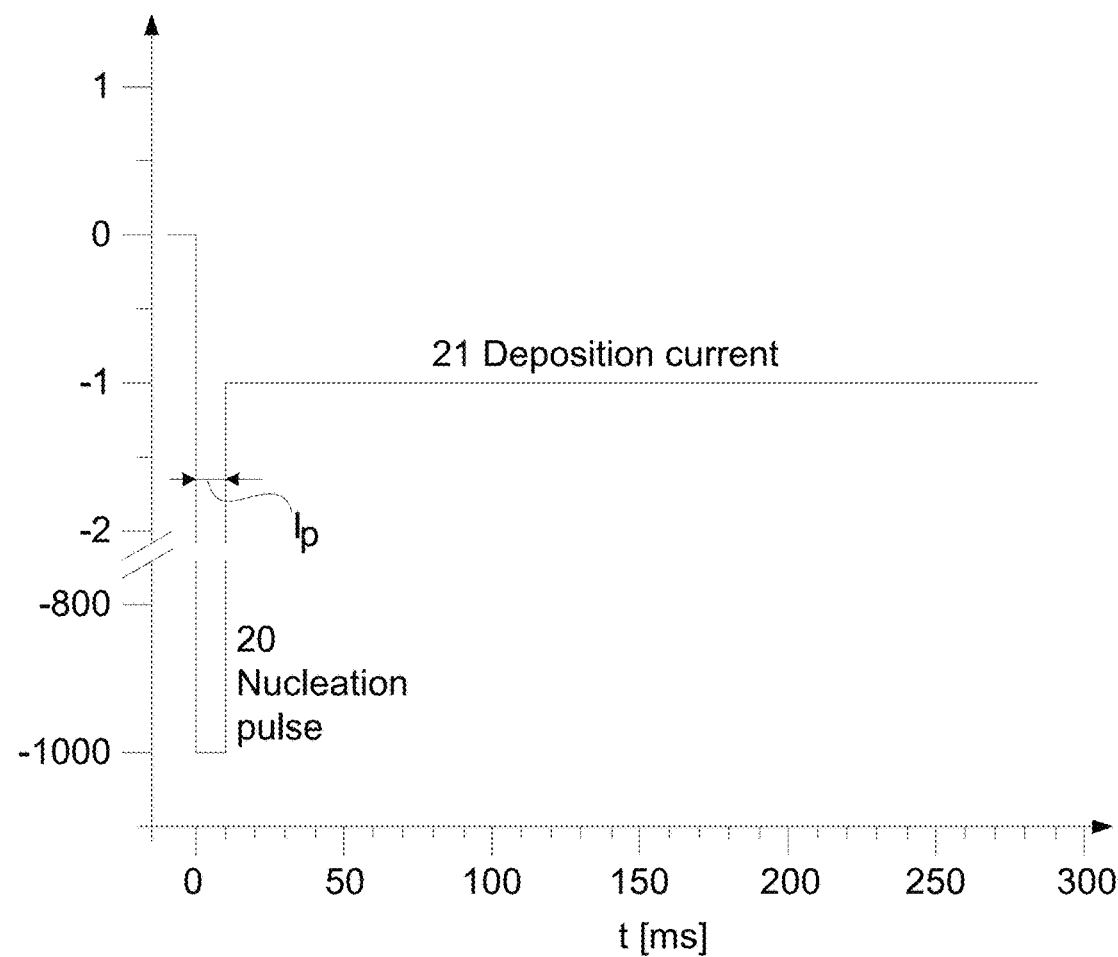
FIG. 2 shows a graph illustrating a first embodiment of a charge procedure.
Figure 3:
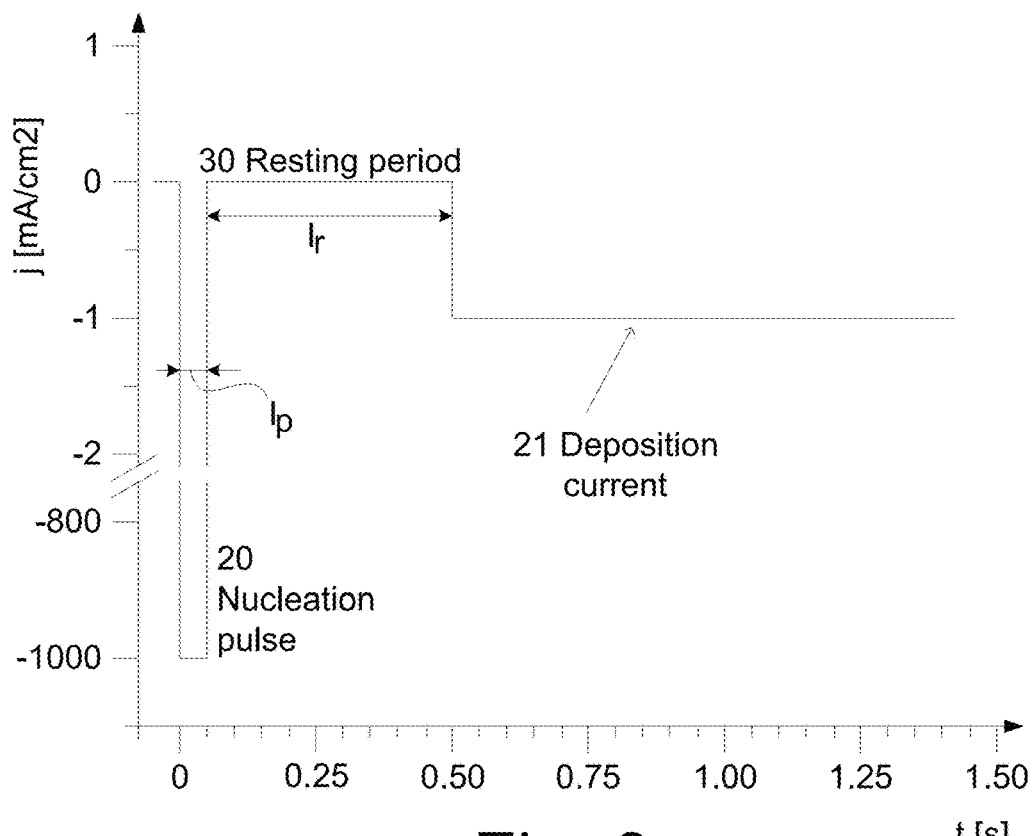
FIG. 3 shows a graph illustrating a second embodiment of a charge procedure.
Figure 4:
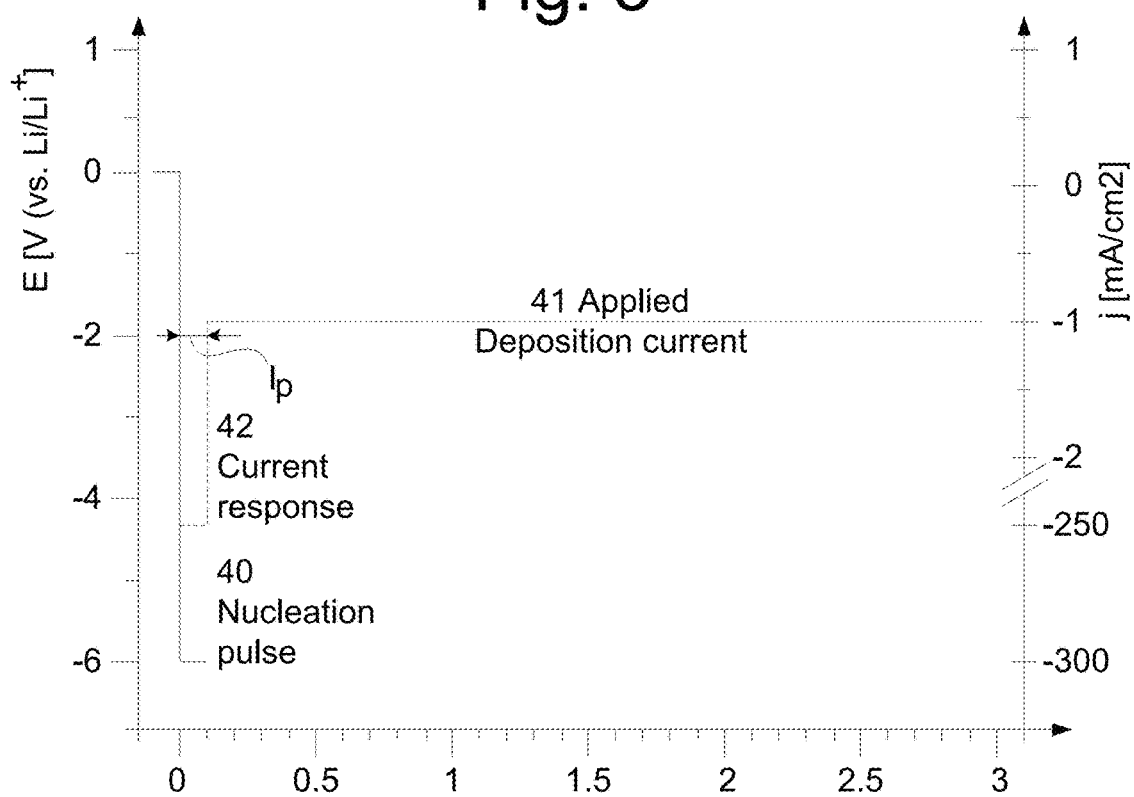
FIG. 4 shows a graph illustrating a third embodiment of a charge procedure.
Figure 5:
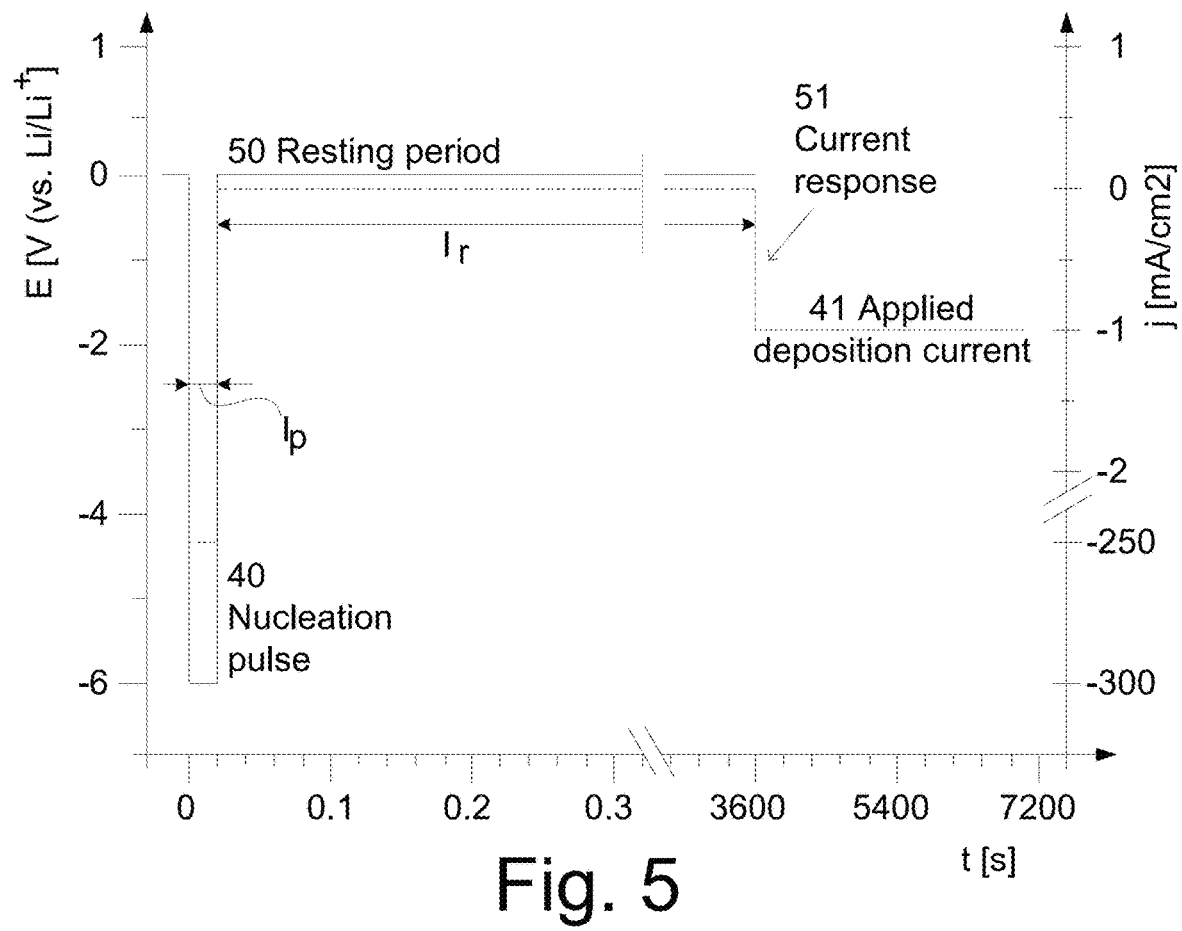
FIG. 5 shows a graph illustrating a fourth embodiment of a charge procedure.

FIGS. 2 and 4 illustrate treatment variants with only a nucleation pulse prior to deposition, and FIGS. 3 and 5 illustrate treatment variants with a nucleation pulse followed by a resting period prior to deposition.

The molarity of the salt in each electrochemical cell defines an equilibrium potential, which may be calculated according to Nernst equation for a half cell, and a potential of each nucleation pulse may be selected to be lower than the equilibrium potential for each electrochemical cell in the electrochemical device.

Nernst equation may be expressed as follows:

$$E = E^o - \frac{RT}{zF}\ln Q$$

where E is the half-cell reduction potential at the temperature of interest, $E^O$ is the standard half-cell reduction potential, R is the universal gas constant (8.314 J/K mol), T is the temperature in kelvins (K), z is the number of electrons transferred in the half-cell reaction (1 for Li=>Li++e−), F is the Faraday constant (96485 C/mol) and Q is the reaction quotient. Q can be expressed as Q=a(red)/a(ox), where a(red) is the activity of the reduced form and a(ox) is the activity of the oxidized form, For a metallic lithium electrode, Q=1/a(ox), which may be simplified to 1/C(ox) since the potential depends on the concentration of oxidized species (i.e. the $Li^+$ content in the solution at the electrode surface).

The potential of each nucleation pulse may be selected by applying a voltage over the electrochemical device, having an amplitude less than 10V, or at least less than 6V, with the negative electrode as negative terminal for each electrochemical cell. According to one aspect, the potential of each nucleation pulse may be selected by applying a voltage over the electrochemical device, having an amplitude higher than 1V, or at least higher than 2V, with the negative electrode as negative terminal for each electrochemical cell.

Thus, the potential of each nucleation pulse may be selected by applying a voltage $V_p$ over the electrochemical device with the negative electrode as negative terminal for each electrochemical cell within the following ranges:

$V_p$<10V $V_p$<6V $1V<V_p<10V$ $1V<V_p<6V$ $2V<V_p<10V$ $2V<V_p<6V$

The pulse length $l_p$ of each nucleation pulse may be selected to be less than 100 ms, i.e. $l_p<100$ ms, or less than 20 ms, i.e. $l_p<20$ ms. This may be combined with a pulse length selected to be longer than 1 ms, i.e. 1 ms$<l_p<100$ ms or 1 ms$<l_p<20$ ms, or longer than 10 ms, i.e. 10 ms$<l_p<100$ ms or 10 ms$<l_p<20$ ms In FIG. 2, a current j is used to create a nucleation pulse 20 followed by a constant deposition current 21. The magnitude of the nucleation pulse is 1 A/cm$^2$ in this example which is applied for 10 ms, i.e. the pulse length $l_p$ is 10 ms, prior to applying an electrical deposition current of 1 mA/cm$^2$ for charging the electrochemical device.

In FIG. 4, a potential E is used to create a nucleation pulse 40 followed by a constant deposition current 41. The amplitude of the potential over the electrochemical device is in this example 6V which is applied for 100 ms, i.e. the pulse length $l_p$ is 100 ms, prior to applying an electrical deposition current of 1 mA/cm$^2$ for charging the electrochemical device. The current response 42 when applying a voltage over the electrochemical device is illustrated by the dashed line and is in this example approximately 250 mA/cm$^2$.

The nucleation pulse may be selected to be followed by a resting period with a rest length $l_r$ before applying a deposition current. According to one aspect, an applied voltage in the resting period is selected to be less than or equal to 0V, i.e. ≤0V, with the negative electrode as negative terminal for each electrochemical cell. According to another aspect, the rest length is selected to be equal to, or longer than, the previous pulse length, i.e. $l_r \geq l_p$.

The rest length $l_r$ may be selected to be longer than 1 ms, 1 s, 1 minute, 1 hour, 24 hours, or 1 week. The prerequisites created by the nucleation pulse does not deteriorate during the resting period. It might even be advantageous to extend the rest length to achieve equilibrium conditions in the electrolytic solution.

In FIG. 3, a current j is used to create a nucleation pulse 20 followed by a resting period 30 and a constant deposition current 21. The magnitude of the nucleation pulse is 1 A/cm$^2$ in this example which is applied for 50 ms, i.e. the pulse length $l_p$ is 50 ms, prior to a resting period having a rest length $l_r$ which in this example is 450 ms before applying an electrical deposition current of 1 mA/cm$^2$ for charging the electrochemical device.

In FIG. 5, a potential E is used to create a nucleation pulse 40 followed by a resting period and a constant deposition current 41. The amplitude of the potential over the electrochemical device is in this example 6V which is applied for 20 ms, i.e. the pulse length $l_p$ is 20 ms, prior to a resting period having a rest length $l_r$ which in this example is 1 hour (3600 s) before applying an electrical deposition current of 1 mA/cm$^2$ for charging the electrochemical device. The current response 51 when applying a voltage over the electrochemical device is illustrated by the dashed line and is in this example approximately 250 mA/cm$^2$ during the nucleation pulse, and 0 mA/cm$^2$ during the resting period.

By applying a nucleation pulse, with or without the addition of a resting period prior to applying a deposition current, an electrochemical cell having negative and positive electrodes and an electrolytic solution as exemplified above comprises nucleation sites on the negative electrode.

Figures 6A, 6B, 6C:
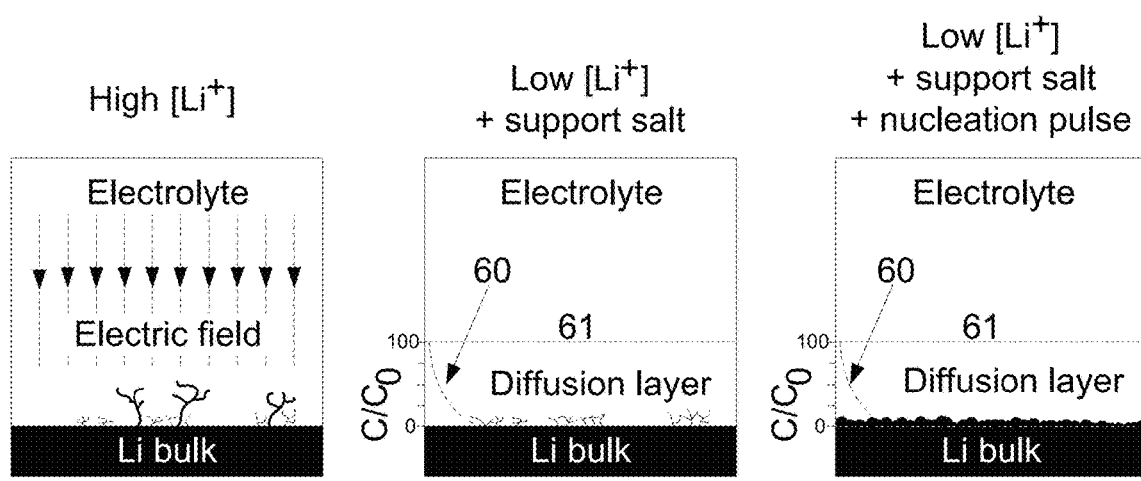
FIGS. 6a-6c show schematic models of lithium growth under different electrochemical conditions.

FIGS. 6a-6c show a modeled behavior of lithium growth and illustrate the lithium growth mechanism during electrodeposition under different conditions. Deposition in highly concentrated Li-ion systems (i.e. 1 M) takes place primarily through migration controlled mass transfer. Migration controlled mass transfer will be controlled by the electric field across the electrolyte. Any local inhomogeneity on the surface will have a higher electric field at its tips (e.g. nuclei or dendrites). This feature will cause preferential growth on dendrites, as opposed to homogeneous deposition over the entire electrode surface, as illustrated in FIG. 6a.

By lowering the Li-ion salt concentration and introducing a high concentration support salt, e.g. tetrabutylammonium hexafluorophosphate (TBAPF$_6$), the mass transfer is pushed towards diffusion control, which yields a more homogeneous distribution of ions to the surface, as illustrated in FIG. 6b. The dashed line 60 illustrates the change in ion concentration in the electrolyte. Close to the surface, the concentration is lower than at the dotted line 61. Thereby reducing the dendritic growth.

By adding a large overpotential nucleation step prior to applying a deposition current will extend the diffusion layer in the electrolyte further away from the electrode surface. In addition, large nuclei coverage of the surface should be obtained by this rapid nucleation step. By extending the diffusion layer, the diffusion limited mass transfer occurs at a more macroscopic scale thereby being less sensitive to local surface roughness factors on the electrode. Large nuclei population will also lower the current density and allow Li growth to be evenly distributed across the entire surface. After a resting period, the diffusion gradient in the electrolyte is reduced, or even eliminated, as indicated in FIG. 6c.

Based on the observed behavior of Li growth during electrodeposition without migration mass transfer it would seem that planar Li growth is indeed possible in liquid electrolytes with no surface controlling additives.

Figure 7A:
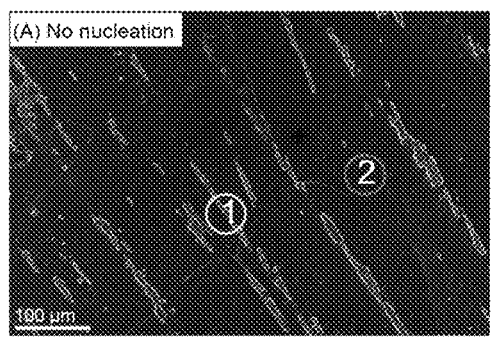
FIGS. 7a-7d show SEM images of grown films on lithium metal electrodes using low concentration $LiPF_6$ electrolytes with/without support salt and with/without a nucleation pulse.
Figure 7A:
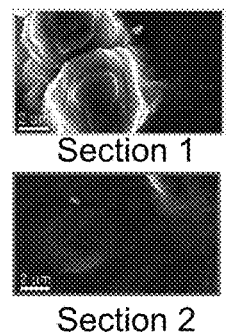
Figure 7B:
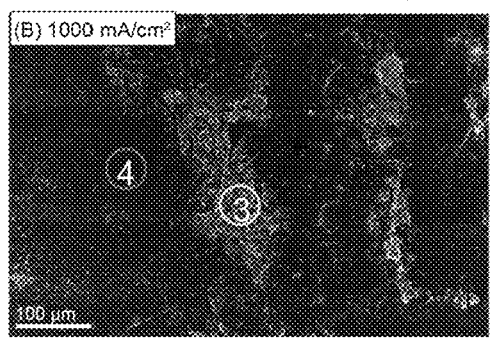
Figure 7B:
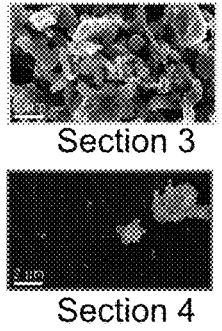
Figure 7C:
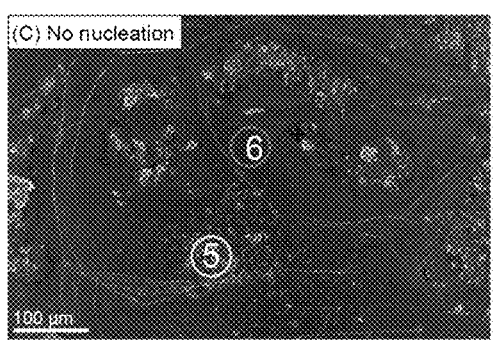
Figure 7C:
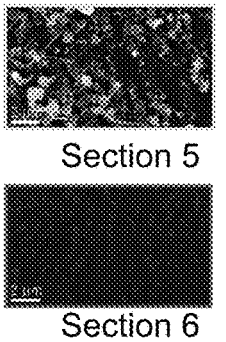
Figure 7D:
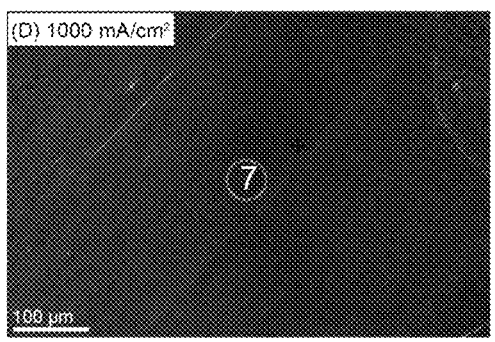
Figure 7D:

FIGS. 7a-7d illustrate low lithium salt concentration, i.e. molarity with and without support salt. Comparative SEM images show grown lithium films in low concentration lithium hexafluorophosphate (LiPF$_6$), i.e. 0.02M LiPF$_6$ with and without additional support salt, i.e. 1M TBAPF$_6$. FIGS. 7a and 7b are SEM images without support salt and FIGS. 7c and 7d are SEM images with support salt. Both variants were studied with (FIGS. 7b and 7d) and without (FIGS. 7a and 7c) a nucleation pulse of 1 A/cm$^2$ applied for 100 ms prior to applying an electrical deposition current of 1 mA/cm$^2$ for charging the electrochemical device for 2000s.

Electrodeposition with low Li-ion concentration electrolytes does seem to affect the dendrite growth by forcing the deposition to take place along the surface instead of perpendicular to it. A tetrabutylammonium hexafluorophosphate (TBAPF$_6$) supporting salt was added and the Li surface morphology was studied and compared for depositions in only low concentration (see FIGS. 7a and 7b) and with added TBAPF$_6$ (see FIGS. 7c and 7d).

The Li growth was further compared for galvanostatic deposition at 1 mA/cm2 with (see FIGS. 7b and 7d) and without an applied 1 A/cm2 nucleation pulse (see FIGS. 7a and 7c). The surface after deposition in 0.02 M LIPF$_6$ shows no sign of dendrite clusters and is instead partly covered by nanosized Li crystals (see section 1) whereas a smooth planar Li film essentially covers the remaining surface (see section 2).

Similar morphology was observed during deposition without nucleation pulse in the electrolyte containing an added supporting salt. The nanostructured Li growth observed does differ slightly in shape as a more spherical growth was found (see section 3) in comparison to the dendritic growth observed for the electrolyte without supporting salt. More importantly, the resulting Li deposit after applied nucleation pulse in the supporting salt system is essentially planar. As seen in FIG. 7d, deposited Li follows the substrate microstructure and could as such be considered as sign of planar lithium growth.

Figure 8:
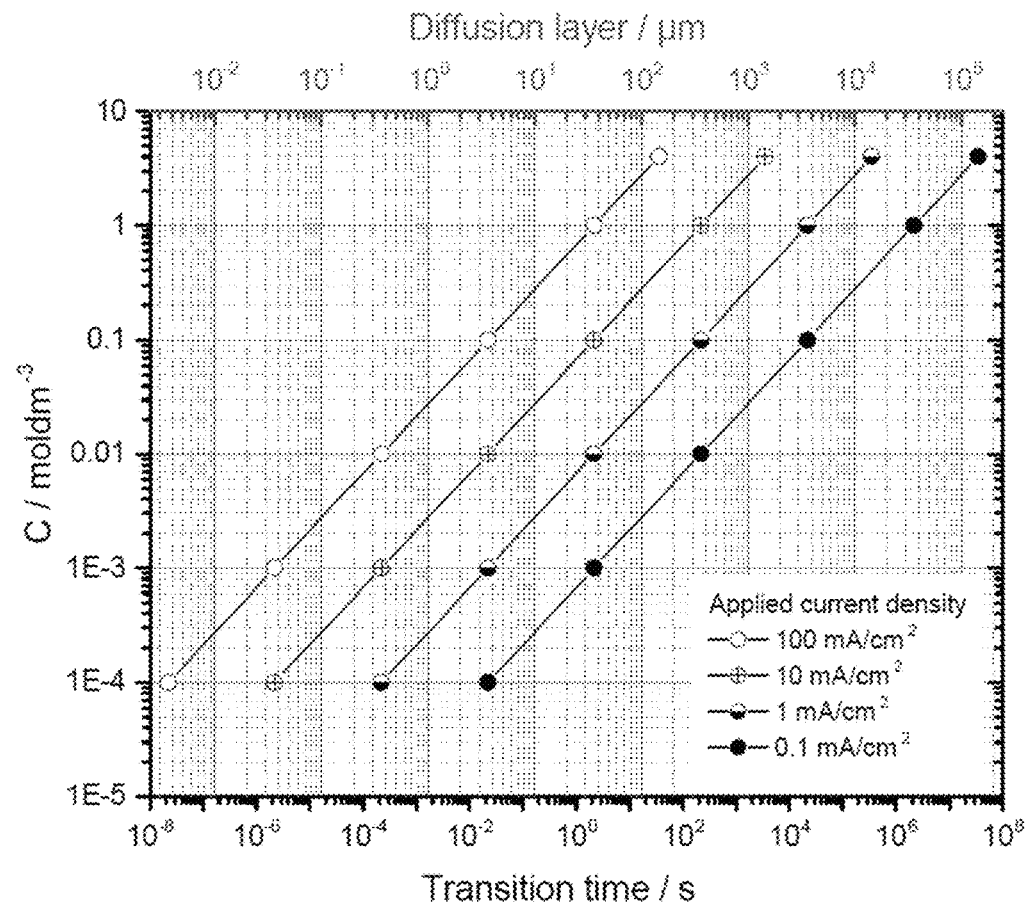
FIG. 8 shows a graph illustrating the transition time, calculated using Sand equation, versus diffusion layer thickness for different current densities.

FIG. 8 illustrates the relation between Li-ion concentration and the transition time as well as diffusion layer thickness. Calculating the transition time for a deposition is highly useful as it indicates the time required to lower the ion concentration in the electrolyte (e.g. Li-ion) based on the thickness of the electrolyte (i.e. separator thickness). However since Li-ions are replenished at the lithium counter electrode in the symmetrical Li—Li system used in this example, there will be an opposing Li diffusion layer growing from the counter electrode towards the working electrode. By combining these two calculations based on the Sand equation it is possible to estimate the bulk electrolyte Li-ion concentration needed to uphold a certain current density.

The Sand equation is defined as follows:

$$\tau^{1/2} = \frac{nFD^{1/2}\pi^{1/2}c^0}{2 \cdot j}$$

where $\tau$ is the transition time, n denotes the number of electrons, D the diffusion coefficient, c the concentration and j the current density.

These calculations are based on a Li diffusion coefficient of $3*10^{-6}$ cm$^2$/s. In order to uphold a current density of 1 mA/cm$^2$ in our system with a separator (i.e. diffusion layer) thickness of about 60 μm, a bulk Li-ion concentration of at least 0.02 M is required. It should be stressed that these calculations assume semi-infinite diffusion for calculating the transition time, which obviously is not the case with Li-ion regeneration at the counter electrode. Nonetheless, the calculations offer guidelines for optimizing the electrolyte.

It should also be pointed out that any calculation of the transition time assumes purely diffusion controlled mass transport in the electrolyte. Meaning no migration contribution to the mass transport of faradaic active ions (e.g. Li-ions). As such, FIG. 8 can only be used for electrolyte systems including a supporting salt, as this will lower the migration contribution to the mass transport of faradaic active ions. Incorporating a supporting salt that is not involved in any faradaic reactions effectively lowers the migration contribution of Li-ions yielding a diffusion limited mass transport of Li-ions. For example, with 0.02 M LiPF$_6$ and 1 M tetrabutylammonium hexafluorophosphate (TBAPF$_6$) the migration contribution to the current will be about 0.8%, assuming a transport number of 0.4 for Li$^+$; 0.6 for PF$_6^-$ in LiPF$_6$ and 0.3 for TBA$^+$ as well as 0.7 for PF$_6^-$ in TBAPF$_6$.

FIGS. 9a-9d illustrate how to design a nucleation pulse. SEM images show the lithium morphology after applying a deposition current in 0.02M LiPF$_6$ with 1M TBAPF$_6$ support salt. The effect of potentiostatic nucleation prior to galvanostatic deposition is shown in FIGS. 9a-9d. No nucleation pulse is disclosed in FIG. 9a, nucleation pulse followed by galvanostatic deposition is disclosed in FIG. 9b, nucleation pulse followed by a short resting period prior to galvanostatic deposition, and nucleation pulse followed by a longer resting period prior to galvanostatic deposition is disclosed in FIG. 9d. The schematics in each case (lower right hand drawing) depict the bulk electrolyte concentration prior to galvanostatic deposition.

Figure 9A:
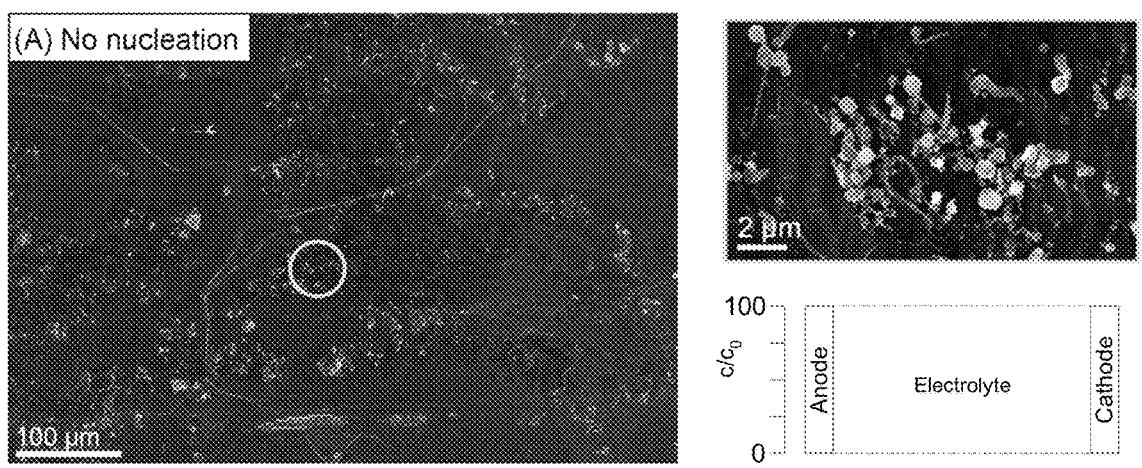
FIGS. 9a-9d show SEM images of the of lithium morphology after deposition for different cases, as well as schematics illustrating the diffusion layer thickness prior to the deposition for each case.
Figure 9B:
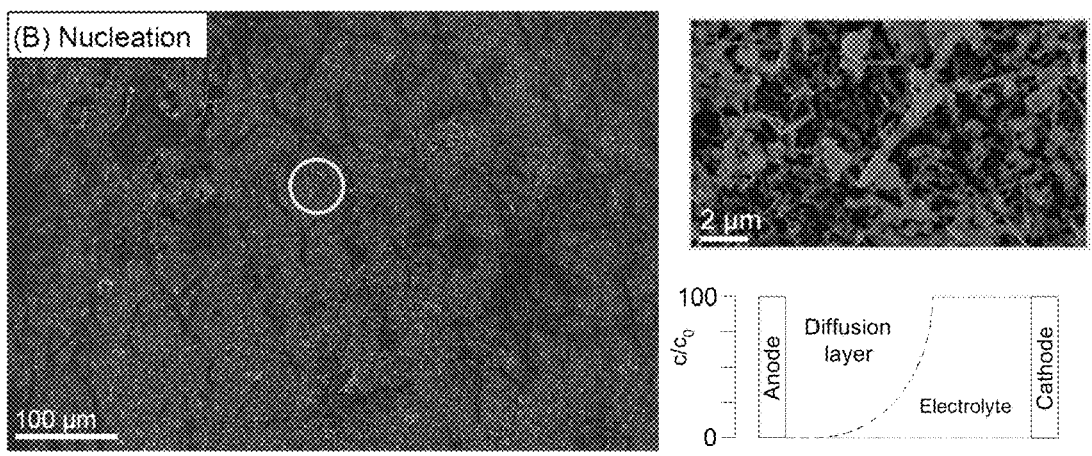

The previously described behavior of lithium growth is probed by investigating the effect of changing the diffusion layer through large overpotential nucleation. With no applied overpotential, i.e. nucleation pulse, sporadic preferential growth occurs as can be seen by the irregular distribution of Li nuclei and dendrites in FIG. 9a. By applying a short cathodic potential pulse, i.e. nucleation pulse, prior to galvanostatic deposition the surface is largely covered by small Li dendrites, as shown in FIG. 9b. The rapid nucleation pulse gives rise to a significant diffusion layer, which upon subsequent galvanostatic deposition forces Li-ion transport to occur either through diffusion or the minor migration contribution.

Figure 9C:
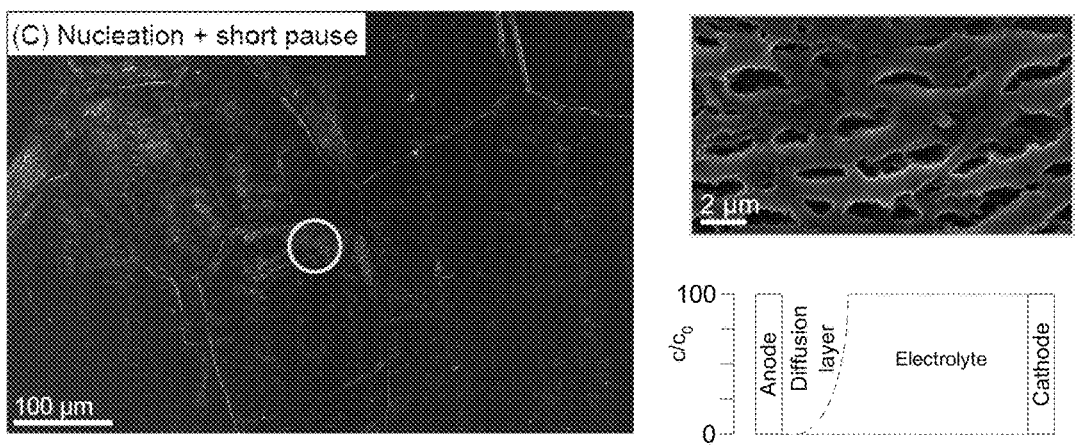
Figure 9D:
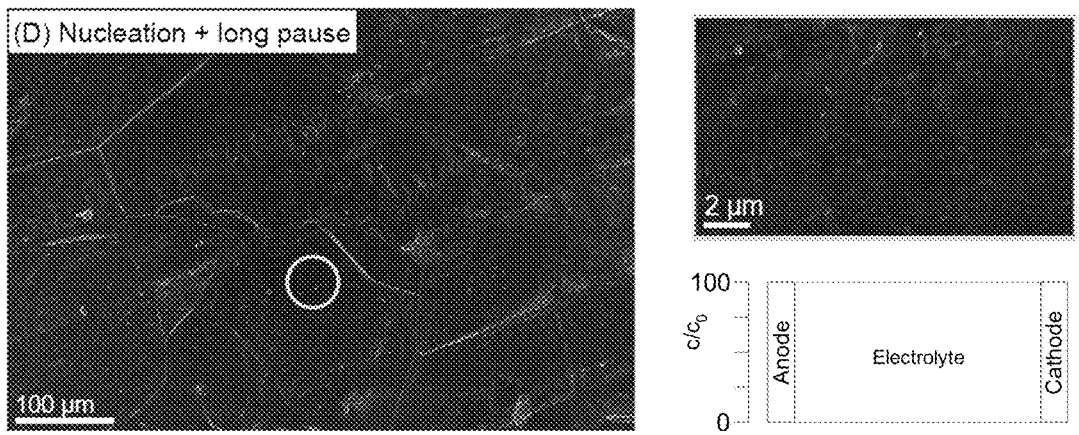

Furthermore, the implementation of a short resting period (i.e. open circuit potential) between potentiostatic nucleation and subsequent galvanostatic deposition removes the Li dendrite formation on the surface as disclosed in FIG. 9c. A radical difference in surface morphology is here observed with a microstructure that resembles the lithium substrates. Therefore, it would seem that nucleation pulse followed by a short pause period creates a diffusion layer and allows it to move closer to the lithium surface. After a longer resting period, in this example 1 hour, the gradient in the electrolyte is eliminated and the surface morphology remains the same as after a short resting period as disclosed in FIG. 9d. The mass transfer of Li-ions is thereby focused to diffusion control resulting in an even Li-ion distribution across the entire electrode surface. It would therefore seem logical that such a system is prone to stable planar lithium growth, dictated by the surface microstructure.

Figure 10:
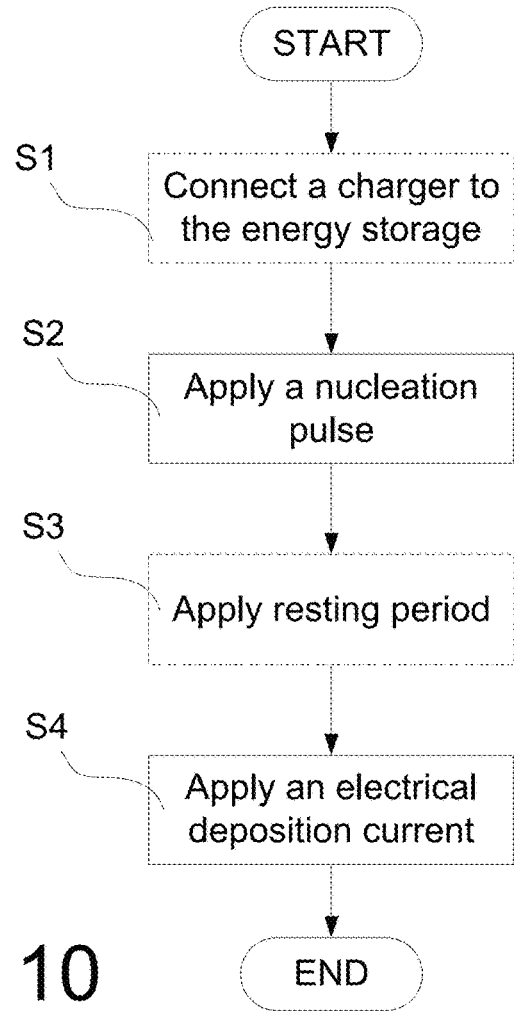
FIG. 10 is a flow chart illustrating the process used to charge an electrochemical cell.

FIG. 10 is a flowchart illustrating a method to treat and charge an electrochemical device having at least one electrochemical cell as disclosed above. The method may comprise connecting a charger to the energy storage in step S1. In some cases the charger may already be connected to the energy storage and only needs to be activated.

The method further comprises treating the electrochemical device by applying at least one electrical nucleation pulse, step S2, each having a pulse length prior to applying an electrical deposition current for charging the electrochemical device as illustrated by step S4 below.

The nucleation pulse, used for treating the electrochemical device in step S2, may be designed since the molarity of the salt in each electrochemical cell defines an equilibrium potential and the step S2 may further comprise selecting a potential of each nucleation pulse to be lower than the equilibrium potential for each electrochemical cell. The potential of each nucleation pulse may be selected by applying a voltage over the electrochemical device, having an amplitude less than 10V, or less than 6V, with the negative electrode as negative terminal for each electrochemical cell. Each nucleation pulse may further be selected by applying a voltage over the electrochemical device, having an amplitude higher than 1V with the negative electrode as negative terminal for each electrochemical cell. If several nucleation pulses are applied, they are separated by a pause as described earlier.

Alternatively, each nucleation pulse may be applied using a current as illustrated in FIG. 2 or 4.

The pulse length of each nucleation pulse may be selected to be less than 100 ms, or less than 20 ms. The pulse length may further be selected to be longer than 1 ms or longer than 10 ms.

After applying at least one nucleation pulse in step S2, the method comprises an optional step S3, in which a resting period with a rest length is selected to follows the last nucleation pulse before deposition in step S4. The resting period may further comprise selecting an applied voltage in the resting period to be less than or equal to 0V with the negative electrode as negative terminal for each electrochemical cell.

The rest length may be selected to be equal to, or longer than, the pulse length. In one embodiment, the rest length is selected to be longer than 1 ms, 1 s, 1 minute, 1 hour, 24 hours, or 1 week. In another embodiment the rest length is selected to achieve equilibrium conditions in the electrolytic solution before applying a deposition current.

Deposition of the negative electrode occurs during charging when the deposition current in step S4, is applied between the negative electrode and the positive electrode. The deposition current may be selected to be less than 10 $mA/cm^2$, or less than 5 $mA/cm^2$, or less than or equal to 1 $mA/cm^2$. The applied deposition current may be selected to be continuous, intermittent or pulsed.

Figure 11:
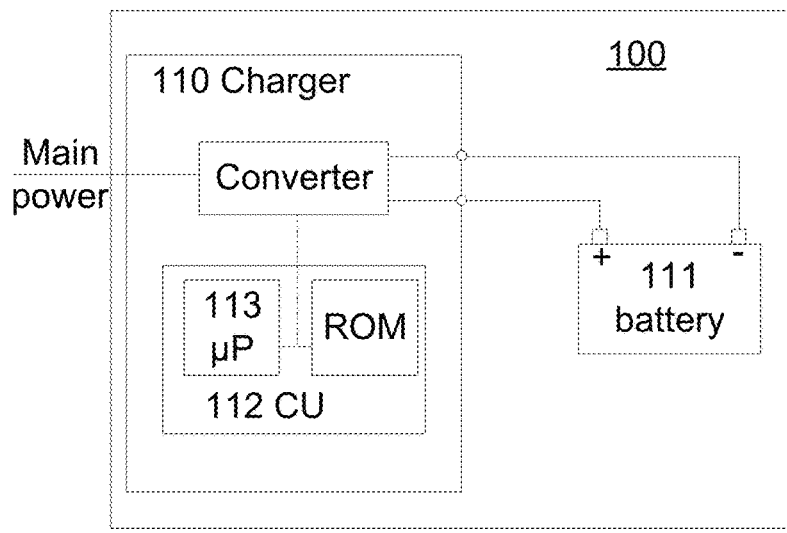
FIG. 11 shows an energy system comprising a charger, control unit and electrochemical device.

FIG. 11 shows an energy system 100 comprising a charger 110 and an electrochemical device 111, i.e. a battery. The charger is configured to treat and charge the electrochemical device by performing the method described in connection with FIG. 10, and the electrochemical device has at least one electrochemical cell 10 as described above. The energy system may further comprise a control unit 112 configured to perform the method by controlling a converter which is connected to the battery 111.

The method may be implemented in a computer program for controlling the charger. The computer program comprises instructions which, when executed on at least one processor 113, cause the at least one processor 113 to carry out the method. The computer program may be stored on a computer-readable storage medium, such as a ROM, USB, etc. carrying the computer program for controlling the charger.

Based on the observed behavior of Li growth during electrodeposition without migration mass transfer, planar Li growth is possible in liquid electrolytes with no surface controlling additives. These results are interesting as they are based on a theory that is essentially the opposite of leading hypotheses regarding control of Li growth through electrodeposition. In fact, most studies into Li electrodeposition for Li-batteries so far highlight the need for high concentration electrolytes. However, it has been shown that in order to control the metal growth and achieve planar film growth low concentration electrolytes and supporting salts are required. The basic idea is based on the premise of removing migration mass transfer of the faradaic active metal ion to allow diffusion control. A feature that is more easily controlled electrochemically by e.g. applying large over potentials (e.g. potentiostatic or galvanostatic).

Figure 12:
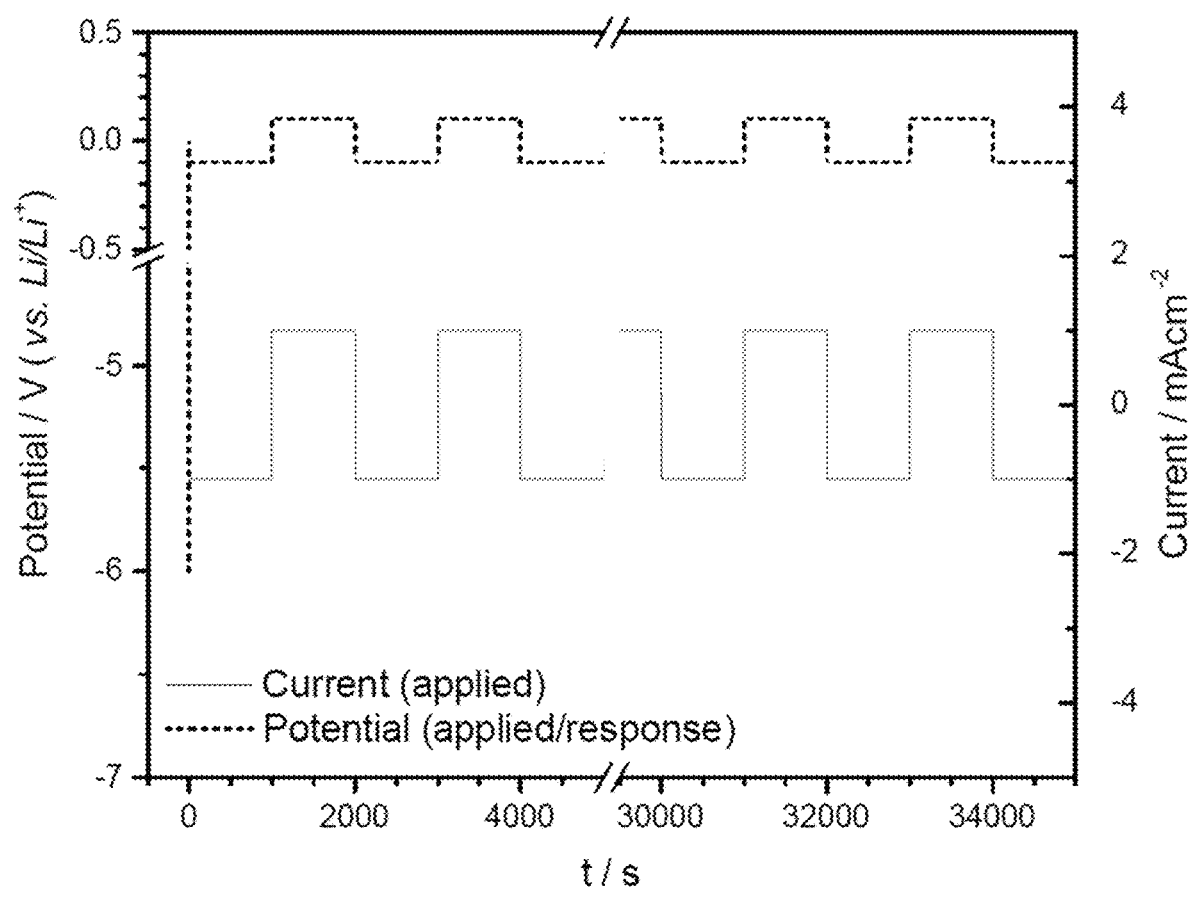
FIG. 12 shows an alternative process for applying deposition current to an electrochemical device.

FIG. 12 illustrates repetitive charging of an electrochemical cell after being exposed to a nucleation pulse a t=0. Several charging and discharging cycles are illustrated in the graph, and the potential over the electrodes is floating and is indicated by a response when the current is applied.

It should be noted that the conditions created by the at least one nucleation pulse and the following optional resting period may be created only one time. The deposition current may be continuous (as illustrated in FIG. 12), or be intermittent, or pulsed. It may be advantageous to expose the electrochemical cell for an additional nucleation pulse at regular intervals.

The invention claimed is:

1. An electrochemical cell comprising:
   a negative electrode including an alkali metal or an alkaline earth metal;
   a positive electrode; and
   an electrolytic solution between the negative electrode and the positive electrode, and a salt including ions of the alkali metal or the alkaline earth metal of the negative electrode dissolved in the electrolytic solution with a molarity lower than 0.25M;
   wherein at least one supporting salt dissolved in the electrolytic solution improves the conductivity of the electrolytic solution; and
   wherein the electrochemical cell is configured to receive at least one electrical nucleation pulse having a pulse length prior to applying an electrical deposition current for charging the electrochemical cell.

2. The electrochemical cell according to claim 1, wherein the salt dissolved in the electrolytic solution has a molarity higher than 0.001M and lower than 0.1 M.

3. The electrochemical cell according to claim 1, wherein the at least one supporting salt dissolved in the electrolytic solution has a molarity at least 4 times higher than the molarity of the salt dissolved in the electrolytic solution.

4. The electrochemical cell according to claim 1, wherein the at least one supporting salt dissolved in the electrolytic solution has a molarity higher than 0.004 M and lower than 3 M.

5. The electrochemical cell according to claim 1, wherein the negative electrode comprises an element selected from the group consisting of lithium, sodium, potassium, magnesium and calcium with a corresponding salt.

6. The electrochemical cell according to claim 1, wherein the negative electrode comprises metallic lithium and the salt is a lithium salt.

7. The electrochemical cell according to claim 6, wherein the negative electrode comprises:
   monolithic lithium metal: or
   a lithium powder and a binder; or
   conductive additive.

8. An electrochemical cell according to claim 1, comprising nucleation sites on the negative electrode after performing a method comprising:
   applying at least one electrical nucleation pulse each having a pulse length prior to applying an electrical deposition current for charging the electrochemical device.

9. A method for treating an electrochemical device having at least one electrochemical cell according to claim 1, wherein the method comprises applying at least one electrical nucleation pulse each having a pulse length prior to applying an electrical deposition current for charging the electrochemical device.

10. The method according to claim 9, wherein deposition occurs when the deposition current is applied between the negative electrode and the positive electrode; and
   wherein the method further comprises charging and selecting the applied deposition current to be less than 10 $mA/cm^2$.

11. The method according to claim 10, wherein the method further comprises selecting the applied deposition current to be continuous, intermittent or pulsed.

12. The method according to any claim 9, wherein the molarity of the salt in each electrochemical cell defines an equilibrium potential; and wherein the method further comprises selecting a potential of the nucleation pulse to be lower than the equilibrium potential for each electrochemical cell.

13. The method according to claim 9, wherein a potential of each nucleation pulse is selected by applying a voltage over the electrochemical device, having an amplitude higher than 1V and less than 10V with the negative electrode as negative terminal for each electrochemical cell.

14. The method according to claim 9, wherein the method further comprises selecting the pulse length of each nucleation pulse to be longer than 1 ms and less than 100 ms.

15. The method according to claim 9, wherein the method further comprises selecting each nucleation pulse to be followed by a resting period with a rest length before deposition.

16. The method according to claim 15, wherein the method further comprises selecting an applied voltage in the resting period to be less than or equal to 0V with the negative electrode as negative terminal for each electrochemical cell.

17. The method according to claim 15, wherein the method further comprises selecting the rest length to be longer than 1 ms to achieve equilibrium conditions in the electrolytic solution.

18. A charger for charging an electrochemical device having at least one electrochemical cell, each electrochemical cell having a negative electrode including an alkali metal or an alkaline earth metal, a positive electrode, an electrolytic solution between the negative electrode and the positive electrode, and a salt including ions of the alkali metal or the alkaline earth metal of the negative electrode dissolved in the electrolytic solution with a molarity lower than 0.25M, wherein at least one supporting salt dissolved in the electrolytic solution improves the conductivity of the electrolytic solution, and wherein the electrochemical cell is configured to receive at least one electrical nucleation pulse having a pulse length prior to applying an electrical deposition current for charging the electrochemical cell:
wherein the charger is configured to perform the method according to claim 9.

19. A non-transitory computer-readable storage medium carrying a computer program comprising instructions which, when executed on at least one processor, cause the at least one processor to carry out the method according to claim 9.

20. An energy system comprising:
at least one electrochemical device having at least one electrochemical cell, each electrochemical cell having a negative electrode including an alkali metal or an alkaline earth metal, a positive electrode, and an electrolytic solution between the negative electrode and the positive electrode, and a salt including ions of the alkali metal or the alkaline earth metal of the negative electrode dissolved in the electrolytic solution with a molarity lower than 0.25M, wherein at least one supporting salt dissolved in the electrolytic solution improves the conductivity of the electrolytic solution, and wherein the electrochemical cell is configured to receive at least one electrical nucleation pulse having a pulse length prior to applying an electrical deposition current for charging the electrochemical cell;
a charger configured to perform a method that involves applying at least one electrical nucleation pulse length prior to applying an electrical deposition current for charging the electrochemical device, and
a control unit configured to perform the method according to claim 9.

* * * * *